United States Patent
Takamatsu et al.

(10) Patent No.: US 9,604,540 B2
(45) Date of Patent: *Mar. 28, 2017

(54) IN-VEHICLE DISPLAY APPARATUS

(71) Applicant: Yazaki Corporation, Tokyo (JP)

(72) Inventors: Masahiro Takamatsu, Makinohara (JP); Tai Inoue, Makinohara (JP); Masahide Nagata, Makinohara (JP); Takayuki Ogawa, Makinohara (JP); Gosei Sato, Makinohara (JP); Takao Kanai, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/852,765

(22) Filed: Sep. 14, 2015

(65) Prior Publication Data

US 2016/0075234 A1 Mar. 17, 2016

(30) Foreign Application Priority Data

Sep. 12, 2014 (JP) .................. 2014-186943

(51) Int. Cl.
*B60Q 1/00* (2006.01)
*B60K 35/00* (2006.01)

(52) U.S. Cl.
CPC ...... *B60K 35/00* (2013.01); *B60K 2350/1096* (2013.01); *B60K 2350/962* (2013.01)

(58) Field of Classification Search
CPC .............................. B60R 1/00; B60R 2225/00
See application file for complete search history.

(56) References Cited

U.S. PATENT DOCUMENTS

| | | | |
|---|---|---|---|
| 2008/0150709 A1* | 6/2008 | Yamamoto | B60K 35/00 340/441 |
| 2009/0135089 A1* | 5/2009 | Konishi | B60K 35/00 345/1.3 |
| 2012/0218295 A1 | 8/2012 | Hashikawa et al. | |
| 2014/0018974 A1* | 1/2014 | Okita | B60W 30/20 701/1 |
| 2015/0217684 A1 | 8/2015 | Frens et al. | |

FOREIGN PATENT DOCUMENTS

| | | |
|---|---|---|
| JP | 162131 U | 4/1989 |
| JP | 2005186784 A | 7/2005 |
| JP | 2008001120 A | 1/2008 |
| JP | 2008290685 A | 12/2008 |
| JP | 2009208680 A | 9/2009 |
| JP | 2012210901 A | 11/2012 |
| JP | 2013-78969 A | 5/2013 |
| JP | 2015529334 A | 10/2015 |
| WO | 2008092598 A1 | 8/2008 |
| WO | 2011055699 A1 | 5/2011 |

OTHER PUBLICATIONS

Office Action issued on Oct. 25, 2016, by the Japanese Patent Office in counterpart Japanese Application No. 2014-186943.

* cited by examiner

*Primary Examiner* — Shirley Lu
(74) *Attorney, Agent, or Firm* — Sughrue Mion, PLLC

(57) ABSTRACT

A display unit incorporated in the housing surface of an instrument panel changes its display variously together with other display devices of the instrument panel such as a liquid crystal display, and displays information such as driving information, danger notification information and entertainment information in coordination.

5 Claims, 9 Drawing Sheets

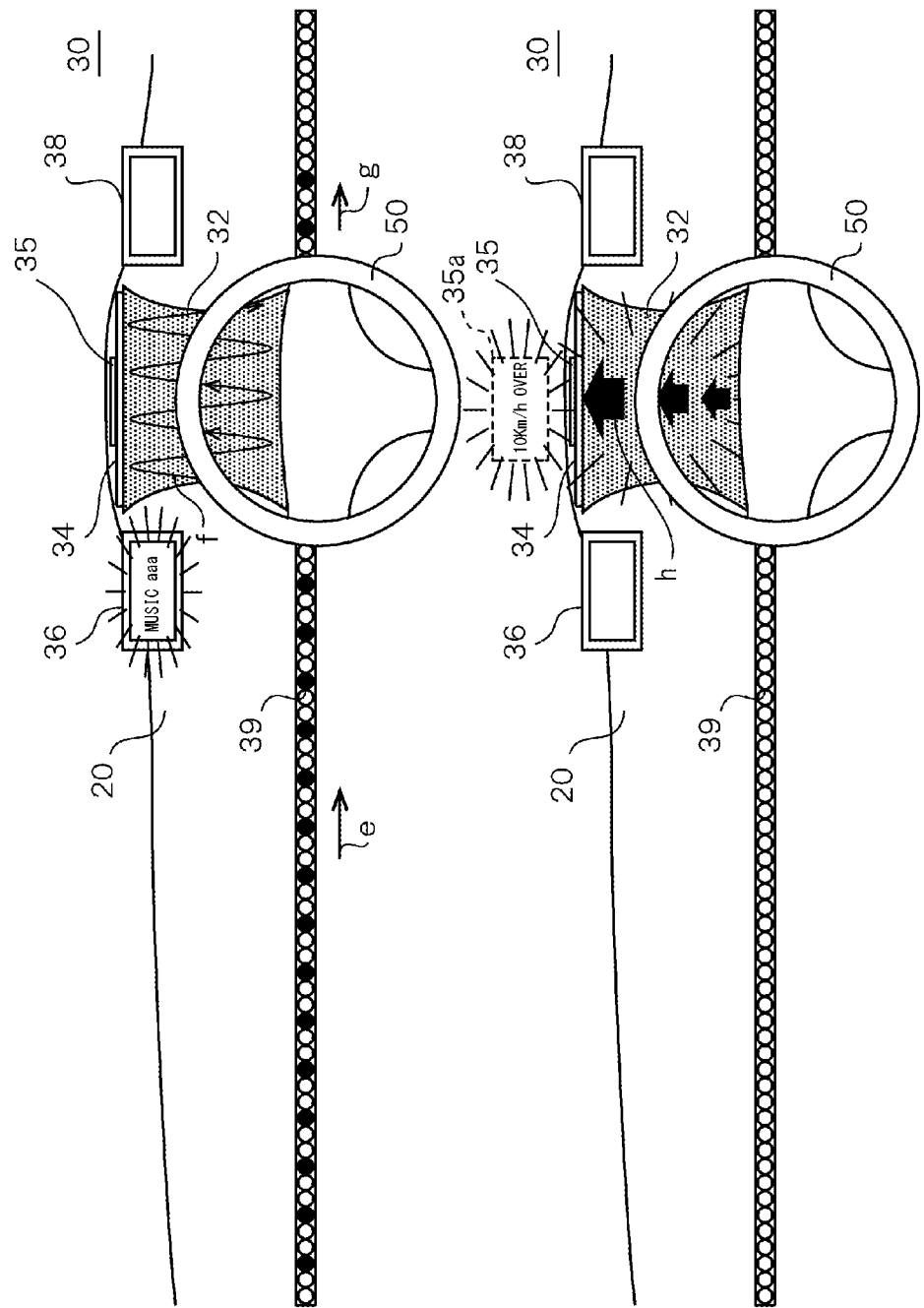

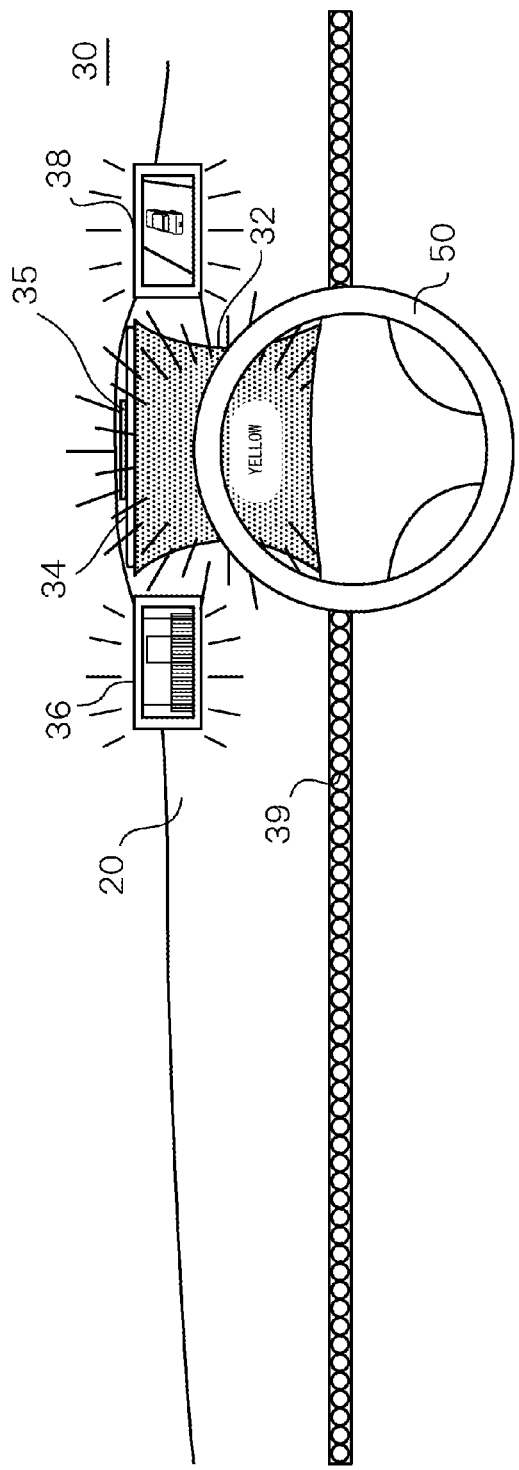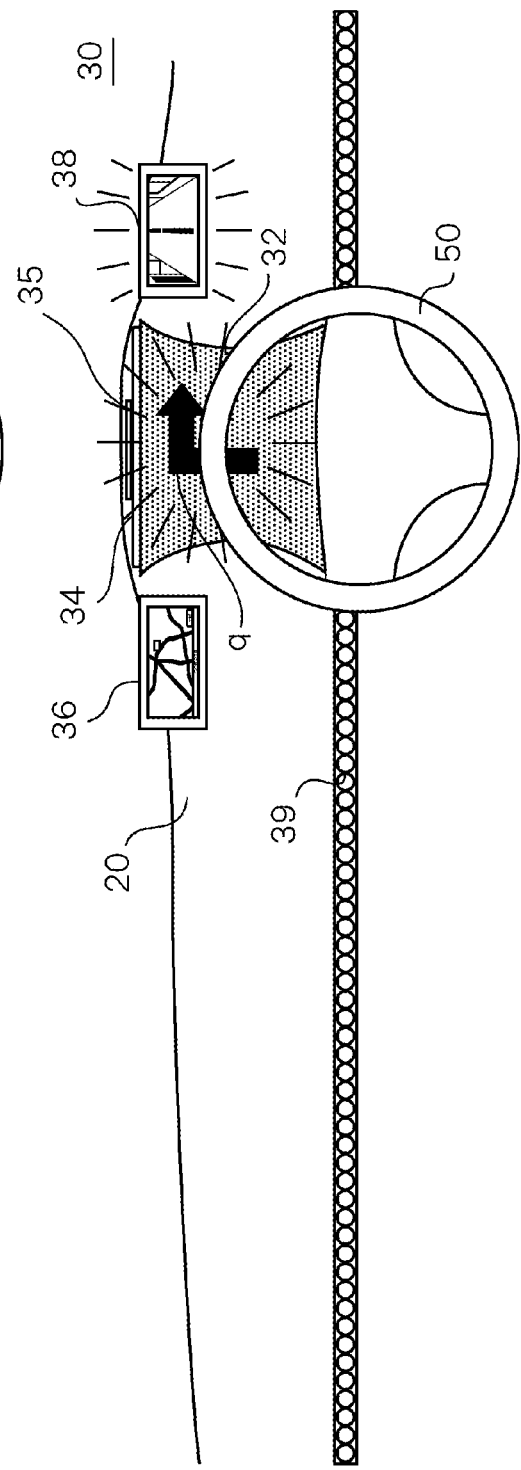
FIG. 8A
FIG. 8B

IN-VEHICLE DISPLAY APPARATUS

CROSS-REFERENCE TO RELATED APPLICATIONS

The present application claims priority from Japanese Patent Application No. 2014-186943 filed on Sep. 12, 2014, the entire contents of which are incorporated herein by reference.

FIELD OF INVENTION

The present invention relates to an in-vehicle display apparatus mounted on a vehicle.

RELATED ART

Normally, information such as driving assist information is displayed by a display device such as a display or a meter installed in the vehicle.

For example, a driving assist system is available in which a character appears on the display device installed in the cabin and various pieces of information are presented to the driver through the character (see Patent Document JP-A-2013-78969).

However, in this conventional driving assist system, on one display device disposed on the front surface of the instrument panel, as various pieces of information, music information is displayed, a navigation screen is displayed, and information on the Internet is displayed. That is, various pieces of information having different contents are displayed on the display device installed in one place in the cabin.

For this reason, information is not displayed in a position suitable for the role of the display, which makes the information hard to view and hard to understand for the passengers.

On the other hand, when a plurality of display devices are disposed in the cabin, different pieces of information are displayed on the display devices. For this reason, it is difficult to see which piece of information is intended to be preferentially conveyed to the driver and passengers. Consequently, it is difficult to call the driver's attention in assisting driving. In addition, the arrangement of the display devices lacks a sense of unity, which deteriorates the appearance.

The present invention is made in view of the above-mentioned circumstances, and an object thereof is to provide an in-vehicle display apparatus capable of displaying specific information in coordination in a position suitable for the role of the display and capable of making easy-to-understand information conveyed to the passengers.

SUMMARY

To attain the above-mentioned object, an in-vehicle display apparatus according to the present invention is characterized by the following (1) to (4):

(1) An in-vehicle display apparatus that displays various pieces of information in a cabin, comprising:
a first display device incorporated in a housing of an instrument panel; and
a second display device and a third display device installed on the left and the right of the first display device,
wherein pieces of information displayed on the first display device and at least one of the second display device and the third display device are displayed in coordination.

According to the in-vehicle display apparatus of the structure of the above (1), since the first display device and at least one of the second display device and the third display device installed on the instrument panel display specific information in coordination with each other, specific information can be displayed in coordination in a position suitable for the role of the display, so that information conveyed to the passengers can be made easy-to-understand.

(2) The in-vehicle display apparatus of the structure of the above (1), wherein the first display device is provided with a base material where a light source is installed and a surface panel that covers a surface of the base material and directs light emitted from the light source toward a passenger seat side in the cabin.

According to the in-vehicle display apparatus of the structure of the above (2), since various pieces of information are displayed by the first display device incorporated in the surface of the housing of the instrument panel forming the inside of the cabin, the sense of unity of the displayed driving information and the vehicle can be felt. Moreover, since the light emitted from the light source is directed toward the passenger seat side, the image displayed by the first display device can be prevented from being projected onto the windshield.

(3) The in-vehicle display apparatus of the structure of the above (1),
wherein the base material has a plurality of step portions so as to fit the instrument panel, and
the light source is disposed on each step portion.

According to the in-vehicle display apparatus of the structure of the above (3), since the base material is formed so as to have a plurality of step portions, it can be easily formed in a shape fitting the instrument panel and it is easy to arrange the light sources.

(4) The in-vehicle display apparatus of the structure of the above (1),
wherein the first display device is incorporated in the housing of the instrument panel on a driver seat side.

According to the in-vehicle display apparatus of the structure of the above (4), since the first display device and the second and third display devices on the periphery thereof are installed on the instrument panel on the driver seat side, it is easy for the driver to grasp the entire display.

According to the present invention, specific information can be displayed in coordination in a position suitable for the role of the display and the information conveyed to the passengers can be made easy-to-understand.

The present invention has been briefly described above. Further, details of the present invention will be further clarified by reading through the mode for carrying out the invention (hereinafter, referred to as "embodiment") described below with reference to the attached drawings.

BRIEF DESCRIPTION OF THE DRAWINGS

FIG. 7A is a view showing a display example when music is listened to by using entertainment information; FIG. 7B is a view showing a display example when overspeeding occurs;

FIG. 8A is a view showing a display example when the approach to the own vehicle is detected; FIG. 8B is a view showing a display example when guidance is provided by a navigation device 58.

DETAILED DESCRIPTION

Hereinafter, an in-vehicle display apparatus according to the present embodiment will be described by using the drawings. The in-vehicle display apparatus of the present embodiment includes as a part of the instrument panel a display unit incorporated in the surface thereof.

Figure 1:
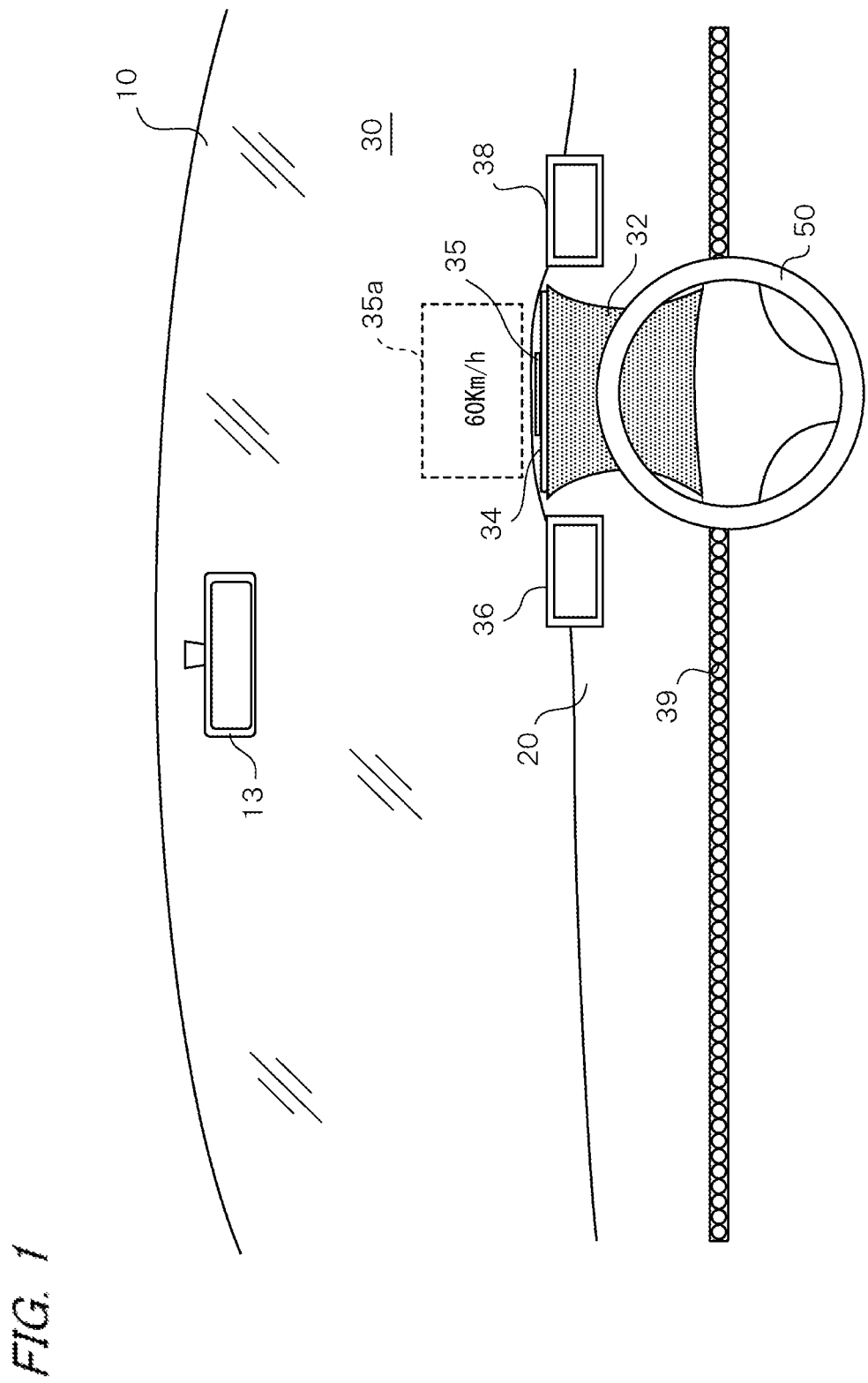
FIG. 1 is a front view showing the appearance of a neighborhood of an instrument panel 20 incorporating a display unit 32 included in an in-vehicle display apparatus according to the present embodiment.

FIG. 1 is a front view showing the appearance of a neighborhood of an instrument panel 20 incorporating a display unit 32 included in the in-vehicle display apparatus according to the present embodiment.

In the cabin viewed from the driver seat side, a windshield 10, a front mirror 13, the instrument panel 20, various kinds of display devices 30, a steering wheel 50 and the like are disposed.

Of the display devices 30, the display unit 32 (the first display device) is integrated by being incorporated in the instrument panel 20 on the central front surface of the instrument panel 20 closest to the steering wheel 50 and situated in a position easy-to-view for the driver.

On both sides of the display unit 32, a pair of liquid crystal displays (the second display device, the third display device) 36 and 38 are disposed. The liquid crystal displays 36 and 38 display various pieces of information such as driving information, danger notification information, navigation information and entertainment information.

Moreover, on the upper surface of the instrument panel 20, a high mount display 34 is disposed. The high mount display 34 displays, for example, an image of the direction indicator.

Moreover, on the upper surface of the instrument panel 20 close to the windshield 10, a head-up display 35 that performs projection toward the windshield 10 is disposed. The head-up display 35 projects speed information and the like onto an area 35a on the windshield 10 which area 35a is easy-to-view for the driver. In FIG. 1, information representative of a speed "60 km/h" is projected.

Below the instrument panel 20, a line illumination 39 extending in the horizontal direction is disposed. The line illumination 39 is formed of a plurality of LED light sources arranged in the horizontal direction, and lights, for example, in such a manner as to flow in the horizontal direction, which provides the driver with a novel impression.

The display unit 32 is a display device extending along the surface of the instrument panel 20 from the driver seat side front surface of the instrument panel 20 to a neighborhood of the front end portion of the windshield 10 and incorporated in such a manner as to be substantially flush with the housing surface of the instrument panel 20.

When the display unit 32 extends to a position extremely close to the front end portion of the windshield 10, the high mount display 34 and the head-up display 35 may be omitted. Moreover, the present embodiment will be described by using as an example a case where a display device is not specifically provided on the passenger seat side instrument panel 20.

Figure 2:
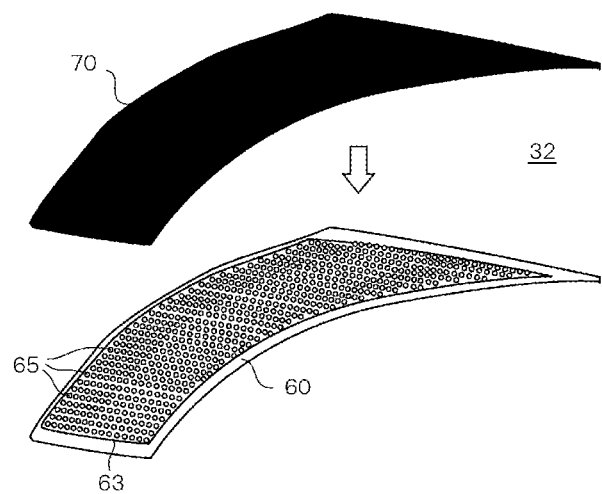
FIG. 2 is a perspective view showing the structure of the display unit 32.

FIG. 2 is a perspective view showing the structure of the display unit 32. The display unit 32 is a display device with a sense of depth extending from the front surface of the instrument panel 20 to the position close to the front end portion of the windshield 10 (a neighborhood of the front end portion), and has a structure where a surface panel 70 is superposed on an LED circuit body 60.

The LED circuit body 60 has a plurality of LED light sources (point light sources) 65 arranged in a staircase pattern on a mount base material 63. The surface panel 70 is curved so as to be superposed on the LED circuit body 60. Moreover, the surface panel 70 forms a surface integral with the instrument panel 20. That is, the surface panel 70 is viewed as a part of the instrument panel 20 by the passengers. The mount base material 63 is formed of a PCB (printed circuit board). The mount base material may have flexibility and be disposed along the curved surface of the instrument panel. In this case, the mount base material 63 is formed, for example, in a sheet form. On the surface of the surface panel 70, a plurality of pores 71 (see FIG. 3) corresponding to the LED light sources are formed as described later.

Figure 3:
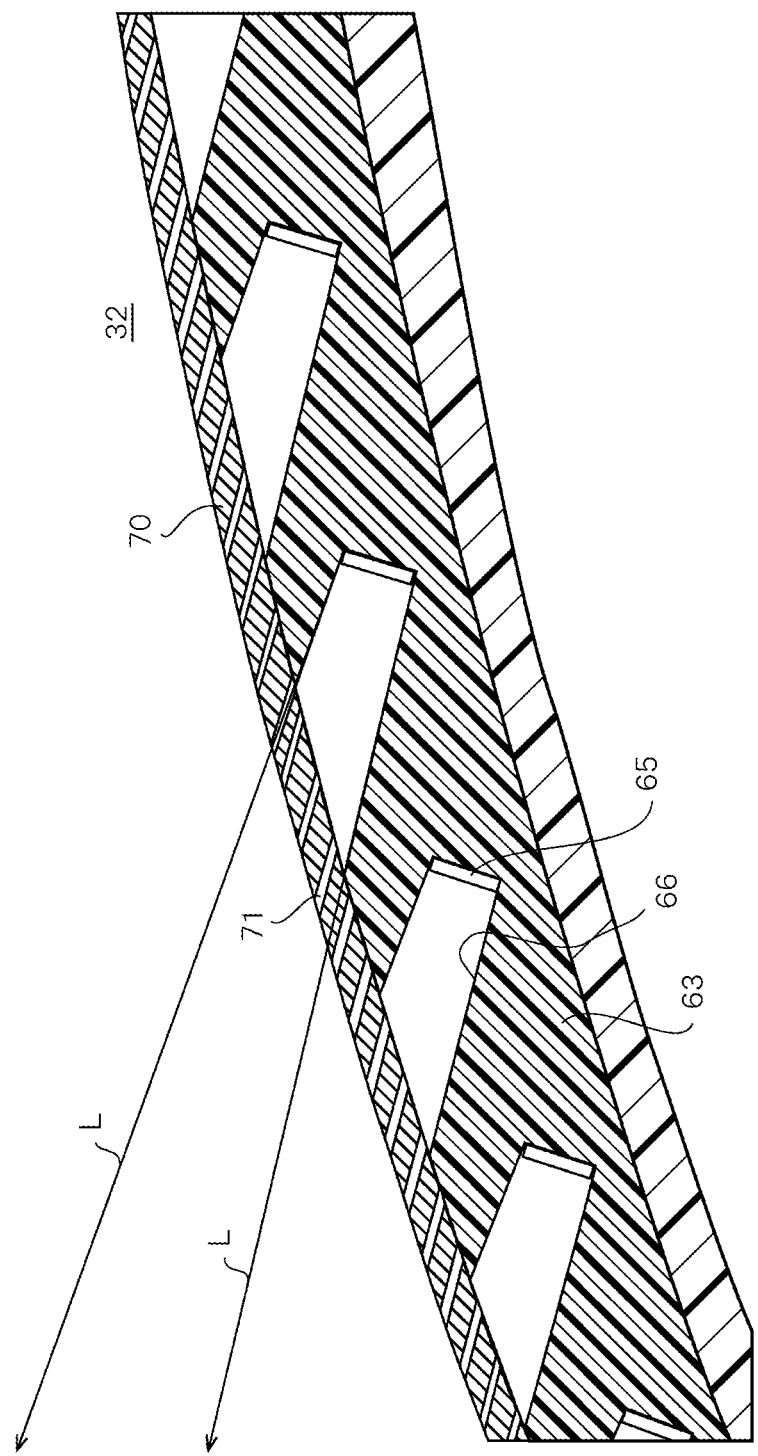
FIG. 3 is a partially enlarged cross-sectional view showing the structure of the display unit 32.

FIG. 3 is a partially enlarged cross-sectional view showing the structure of the display unit 32. On the surface of the mount base material 63, a multiplicity of hole portions 66 (step portions) are formed so as to be opened toward the passenger seat (driver seat) side. The LED light sources 65 are disposed on the bottom surfaces of the hole portions 66, respectively.

On the surface panel 70, the pores 71 are formed so that the light L of the LED light sources 65 emitted through the hole portions 66 is directed toward the passenger seat side. The number of pores 71 is approximately six to nine per LED light source 65. The pores 71 have a predetermined angle with respect to the direction of the thickness of the surface panel 70. The inclination angles of the pores 71 are smaller as they are closer to the passenger seat, and larger as they are closer to the windshield 10. In a place where the surface of the surface panel 70 is vertical or nearly vertical to the direction toward the passenger seat side, the inclination angles of the pores 71 may be 0 degrees.

The hole portions 66 are also inclined with respect to the direction of the thickness of the mount base material 63, and the inclination angles thereof are, similarly to those of the pores 71, smaller as they are closer to the passenger seat, and larger as they are closer to the windshield 10. The inner wall portions of the hole portions 66 also function as a member serving as a canopy that prevents the light L from the LED light sources 65 from being directed toward the windshield 10.

As described above, the inner wall portions of the hole portions 66 and the pores 71 of the surface panel 70 have a light directing function to direct the light emitted from the LED light sources 65 arranged on the mount base material 63 toward the passenger seat side in the cabin. The light directing function may be implemented by either one of the inner wall portions of the hole portions 66 and the pores 71 of the surface panel 70.

Figure 4:
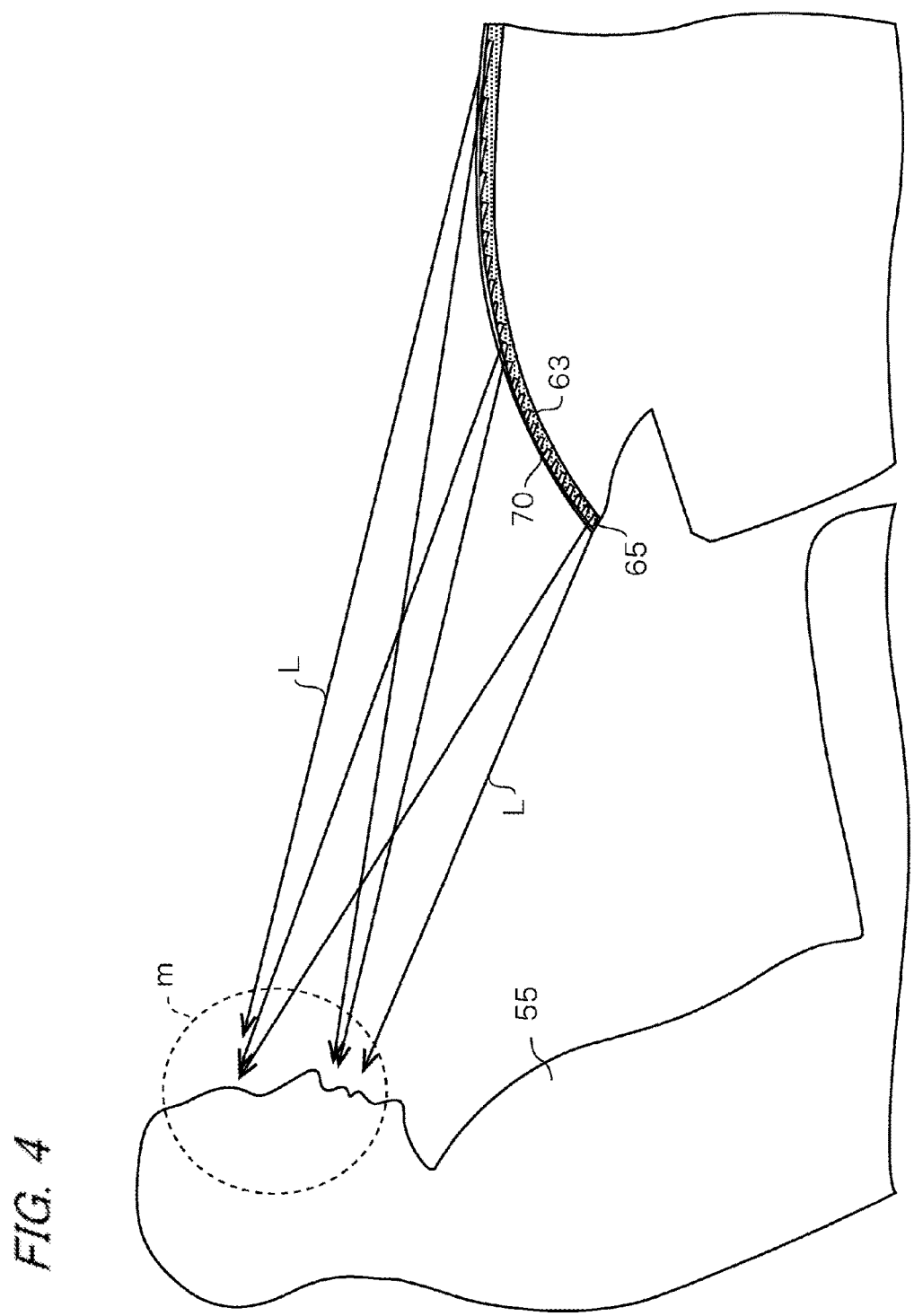
FIG. 4 is a view explaining the traveling direction of light L projected through a surface panel 70 from LED light sources 65 arranged on a mount base material 63.

FIG. 4 is a view explaining the traveling direction of the light L projected through the surface panel 70 from the LED light sources 65 arranged on the mount base material 63. As described previously, since the inclination angles of the pores 71 formed on the surface panel 70 gradually increase from the passenger seat (driver seat) side toward the front end portion of the windshield 10, the light L from all the LED light sources 65 arranged on the LED circuit body 60 is directed toward the face (see the dotted line frame m) of a passenger 55 seated on the passenger seat. Therefore, the passenger 55 can catch the light from all the LED light sources 65 without changing the direction of the line of sight.

On the display unit 32, since the LED light sources 65 disposed on the mount base material 63 are continuously arranged in lines from the passenger seat side to the front end portion of the windshield 10, when they are turned on, display with a sense of depth can be provided. When they are turned off, since the LED circuit body 60 situated inside the surface panel 70 of the display unit 32 is hidden by the pores 71 of the surface panel 70 and the inside of the surface panel 70 is darker than the surrounding areas as external light is difficult to enter the surface panel 70, it is difficult for the passenger to notice the presence of the LED circuit body 60.

Figure 5:
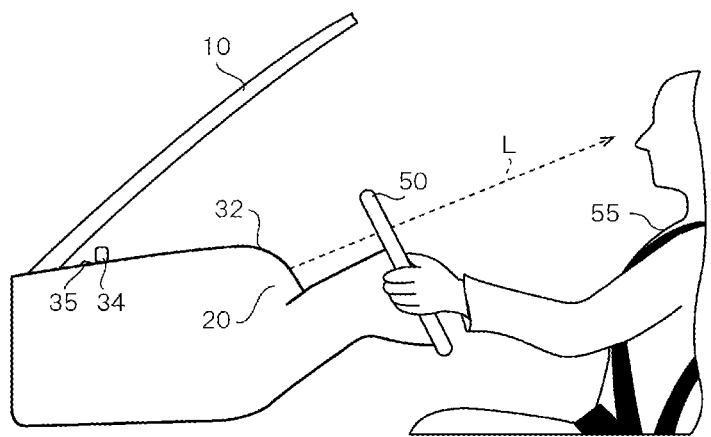
FIG. 5 is a view showing a neighborhood of the instrument panel 20 when the inside of the cabin on the driver seat side is viewed from a side.

FIG. 5 is a view showing a neighborhood of the instrument panel 20 when the inside of the cabin on the driver seat side is viewed from a side. Since the light L emitted from the display unit 32 is directed toward the driver's face, the driver can grasp the display contents of the display unit 32 without changing the orientation of the face.

Figure 6:
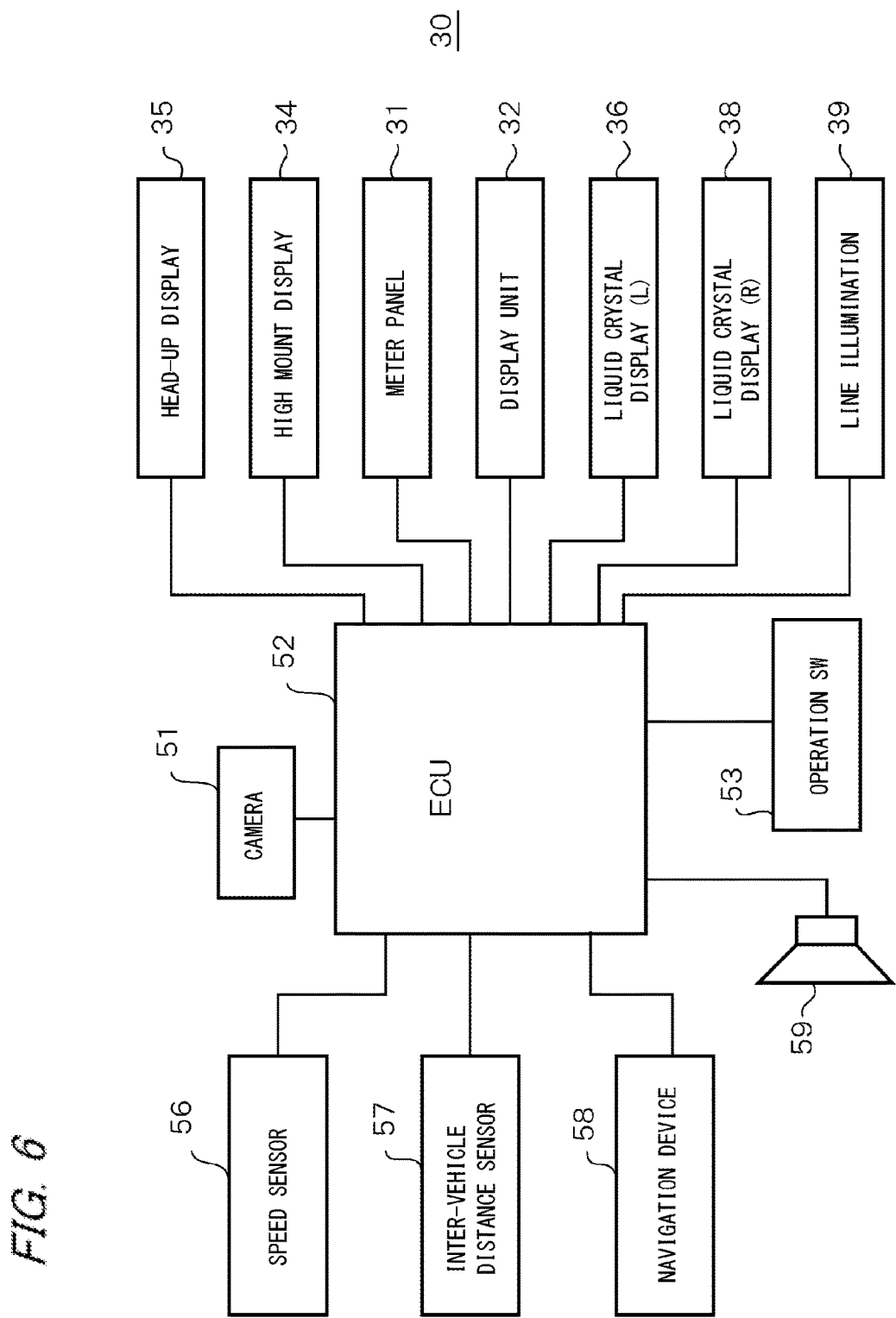
FIG. 6 is a view showing the hardware structure centering on a controller 52 that controls the various kinds of display devices 30 arranged on the instrument panel 20 and its periphery.

FIG. 6 is a view showing the hardware structure centering on a controller 52 that controls the various kinds of display devices 30 arranged on the instrument panel 20. The controller 52 is formed of an ECU (Electronic Control Unit). To the controller 52, not only the above-mentioned various kinds of display devices 30 are connected but also a speed sensor 56, an inter-vehicle distance sensor 57, a navigation device 58, a speaker 59, an operation switch (SW) 53, a camera 51 and the like are connected.

The speed sensor 56 detects the speed of the vehicle. The inter-vehicle distance sensor 57 measures the distance from an object by transmitting and receiving infrared rays and detects the approach to the own vehicle. It may have a structure where the approach to the own vehicle is detected by analyzing an image taken by a camera. Moreover, the inter-vehicle distance sensor 57 may be provided more than one in number in order that the approach of an object to the own vehicle can be detected not only with respect to the front and the back of the vehicle but also with respect to the right and the left.

The navigation device 58 is provided with GPS (Global Positioning System) and map data, and has the function of guiding the own vehicle to a destination. In this example, the navigation screen is displayed on the liquid crystal display 36. The speaker 59 emits sound information such as driving information, warnings and music according to the sound data outputted from the controller 52.

The operation SW 53 is used for various switch inputs by the driver such as selection of entertainment information. The camera 51 is attached to a front part, a rear part, a left part, a right part and the like of the vehicle, and images the front, the back, the left, the right and the like of the vehicle to obtain images. The images taken by the camera 51 are used for the detection of an obstacle, the detection of the approach to the own vehicle and the like.

Next, a display operation by the controller 52 using the display unit 32 will be described.

FIGS. 7A and 7B show display examples when a plurality of display devices are operated in coordination with one another. FIG. 7A shows a display example when music is listened to by using entertainment information. The controller 52 displays the title "aaa" of the music being reproduced on the liquid crystal display 36, and displays a waveform conforming to the rhythm and tempo of the music on the display unit 32. At this time, the controller 52 may further turn on the line illumination 39. For example, the controller 52 moves the lighting part of the line illumination 39 from the left rightward as shown by the arrow e in the figure, and switches the lighting from the line illumination 39 to the display unit 32 when the lighting part reaches the left end of the display unit 32. Then, the controller 52 changes the lighting of the LED light sources 65 in such a manner as to undulate as shown by the arrow f in the figure on the display unit 32, and again switches the lighting to the line illumination 39 when the lighting part reaches the right end of the display unit 32. The controller 52 moves the lighting part of the line illumination 39 further rightward as shown by the arrow g in the figure. The controller 52 repeats this display operation while the music is being played.

FIG. 7B shows a display example when overspeeding occurs. When overspeeding occurs, the controller 52 projects the excess speed by the head-up display 35 to make the driver grasp the extent of overspeeding of the vehicle. Further, the controller 52 displays a mark h representative of the traveling of the vehicle on the display unit 32, and moves it upward in the figure. And the controller 52 increases the forward movement speed of the mark h representative of the traveling of the vehicle displayed on the display unit 32 as the speed obtained by the speed sensor 56 increases. By this display with perspective, the driver not only grasps the excess speed but also easily notices that overspeeding has increased.

FIGS. 8A and 8B show other display examples when a plurality of display devices are operated in coordination with one another. FIG. 8A shows a display example when the approach to the own vehicle is detected. When detecting the approach to the own vehicle from images taken by the camera 51, the controller 52 lights the display unit 32 in yellow. Simultaneously with this display operation, the controller 52 displays the image of the left side taken by the camera 51 on the liquid crystal display 36 on the left side, and displays the image of the right side taken by the camera 51 on the liquid crystal display 38 on the right side.

When the display unit 32 is lit in yellow, by viewing the left and right liquid crystal displays 36 and 38, the driver can grasp the condition outside the vehicle in the horizontal direction without wagging his/her head and can avoid collision. Moreover, since the image of the left side is displayed on the liquid crystal display 36 on the left side and the image of the right side is displayed on the liquid crystal display 38 on the right side, images can be displayed in positions suitable for the role of the display, so that the directions of the taken images can be understood intuitively.

FIG. 8B shows a display example when guidance is provided by the navigation device 58. On the liquid crystal display 36, a navigation screen where the own vehicle mark is superimposed on map information is displayed. When receiving, for example, a signal indicating a right-hand turn from the navigation device 58, the controller 52 controls the lighting of the display unit 32, and displays a mark q formed by the lighting of the LED light sources 65 and representative of a right-hand turn. Further, the controller 52 displays the image of the right-hand turn direction taken by the camera 51 on the liquid crystal display 38 on the right side.

Thereby, the driver performs driving complying with the instruction from the navigation without overlooking the mark q representative of a right-hand turn which mark q is displayed large in size. Further, since the image in the traveling direction is displayed on the liquid crystal display 38 when a right-hand turn is made, the image can be displayed in a position suitable for the role of the display, so that driving can be performed while the safety is confirmed more.

As described above, on the display unit 32 incorporated in the instrument panel 20 on the driver seat side, information (specific information) such as driving information, danger notification information and entertainment information can be displayed in coordination with the display of the display devices on the periphery of the display unit 32 such as the liquid crystal display 36. Moreover, by incorporating the display unit in the instrument panel on the driver seat side, a plurality of display devices can be closely disposed, which makes it easy for the driver to grasp the entire display.

Moreover, normal driving information may be conveyed to the driver by displaying it on the display unit 32 incorporated in the instrument panel 20 on the driver seat side. For example, information such as the direction indicator, the on/off of the headlights and the on/off of the air conditioner may be displayed on the display unit 32.

Thereby, the sense of unity of the displayed driving information and the vehicle can be felt more. Consequently, it is expected that the efficiency of information transmission to the driver improves.

As still another example, as shown in FIGS. 9A to 9H, the display unit 32 can display various contents such as letters, pictures and symbols by a combination of light emitting point light sources, that is, by a dot pattern in coordination with the liquid crystal display 36.

Figure 9A:
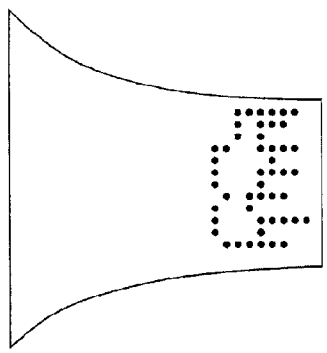
FIG. 9A to FIG. 9H are views showing examples of symbols displayed by point light sources.
Figure 9B:
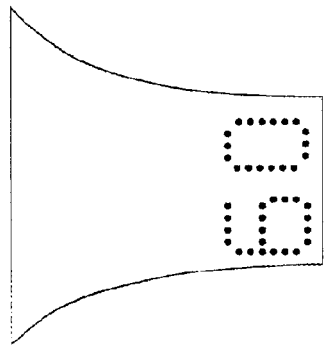
Figure 9C:
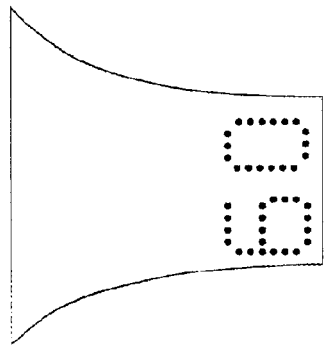
Figure 9D:
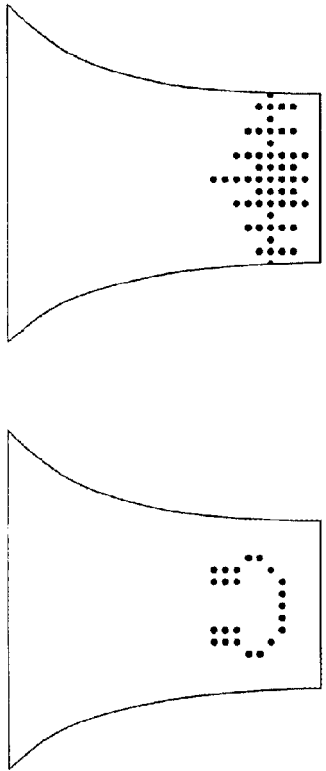
Figure 9E:
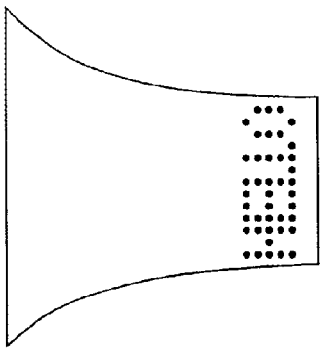
Figure 9F:
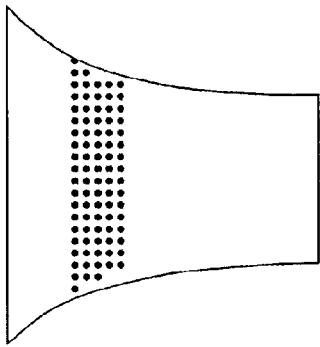
Figure 9G:
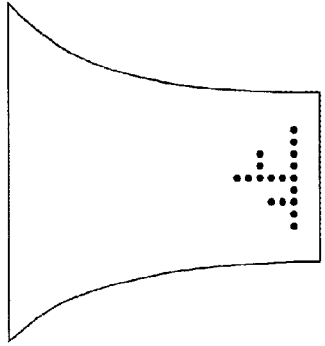
Figure 9H:
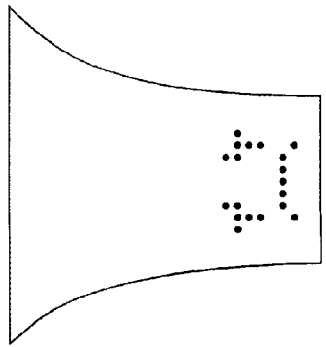

For example, as shown in FIG. 9A, when the vehicle is running smoothly or while bouncy music is being played back, the display unit 32 may display a smile mark. Conversely, as shown in FIG. 9E, in cases such as when the vehicle is running with poor fuel efficiency, a crying face mark or a troubled face mark may be displayed. In addition, the display unit 32 may display the symbol shown in FIG. 9B, the speed shown in FIG. 9C, weather information shown in FIG. 9D, a sign such as "STOP" shown in FIG. 9F, lines corresponding to the inter-vehicle distance shown in FIG. 9G and a message at the time of startup shown in FIG. 9H. Needless to say, this display may be provided by the display unit 32 according to the present embodiment.

The technical scope of the present invention is not limited to the above-described embodiment. The above-described embodiment may be modified or improved variously within the technical scope of the present invention.

For example, while in the above-described embodiment, the display unit 32 incorporated in the instrument panel 20 is formed by arranging a plurality of LED light sources on the rounded mount base material 63 from the front surface of the instrument panel 20 to the neighborhood of the front end portion of the windshield 10 and covering the upper surface thereof with the surface panel 70, it may be formed by previously mounting the LEDs on a printed board formed so as to round from the front surface of the instrument panel 20 to the neighborhood of the front end portion of the windshield 10 and covering the upper surface of this printed board with the surface panel 70.

Moreover, while LED light sources are cited as the light sources used for the display unit 32 in the above-described embodiment, a device that displays an image all over such as organic EL may be adopted as the display unit. Further, a dot pattern may be displayed on organic EL so that the organic EL functions as point light sources.

Moreover, while the display unit is incorporated only in the instrument panel on the driver seat side in the above-described embodiment, it may be incorporated in both the driver seat side and the passenger seat side.

Moreover, while pieces of information displayed on three display devices are linked together in the above-described embodiment, pieces of information displayed on four or more display devices may be linked together.

What is claimed is:

1. An in-vehicle display apparatus that displays various pieces of information in a cabin, comprising:
   a first display device incorporated in a housing of an instrument panel; and
   a second display device and a third display device installed on the left and the right of the first display device,
   wherein pieces of information displayed on the first display device and at least one of the second display device and the third display device are displayed in coordination,
   wherein the first display includes:
      a base material where a light source of the first display device is installed;
      a surface panel that covers a surface of the base material and directs light emitted from the light source toward a seat; and
      pores formed on the surface panel, and
   wherein the surface panel extends from a first end that faces the seat to a second end that faces a windshield.

2. The in-vehicle display apparatus according to claim 1, wherein the surface panel directs light emitted from the light source toward a passenger seat side in the cabin.

3. The in-vehicle display apparatus according to claim 1, wherein the base material has a plurality of step portions so as to fit the instrument panel, and
   the light source is disposed on each of the step portions.

4. The in-vehicle display apparatus according to claim 1, wherein the first display device is incorporated in the housing of the instrument panel on a driver seat side.

5. The in-vehicle display apparatus according to claim 1, wherein the pores have predetermined angles with respect to a direction of the thickness of the surface panel, and
   wherein the predetermined angles are smallest for the pores located at the first end and gradually increase as the surface panel extends towards the second end.

\* \* \* \* \*